Patented Nov. 15, 1932

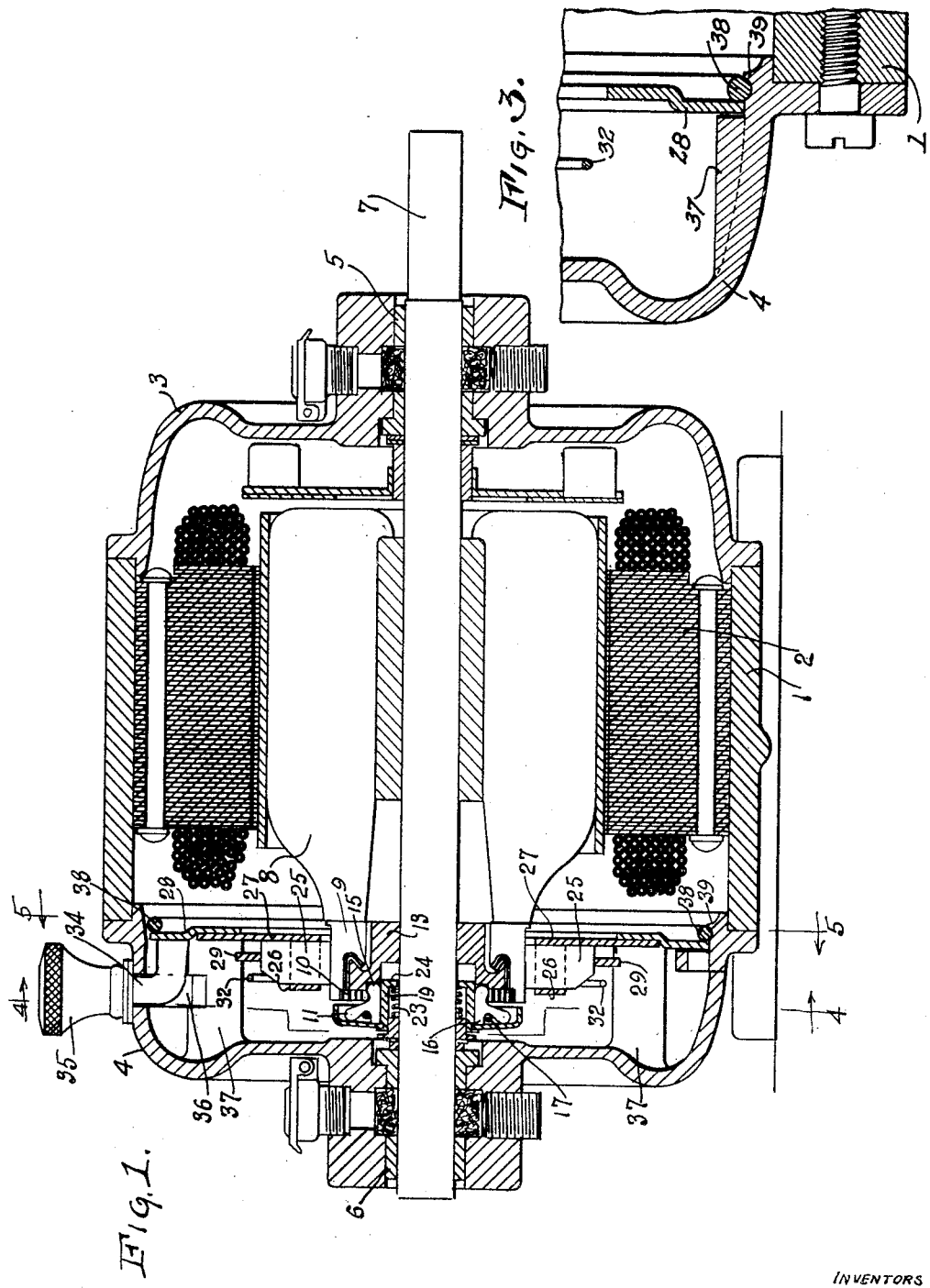

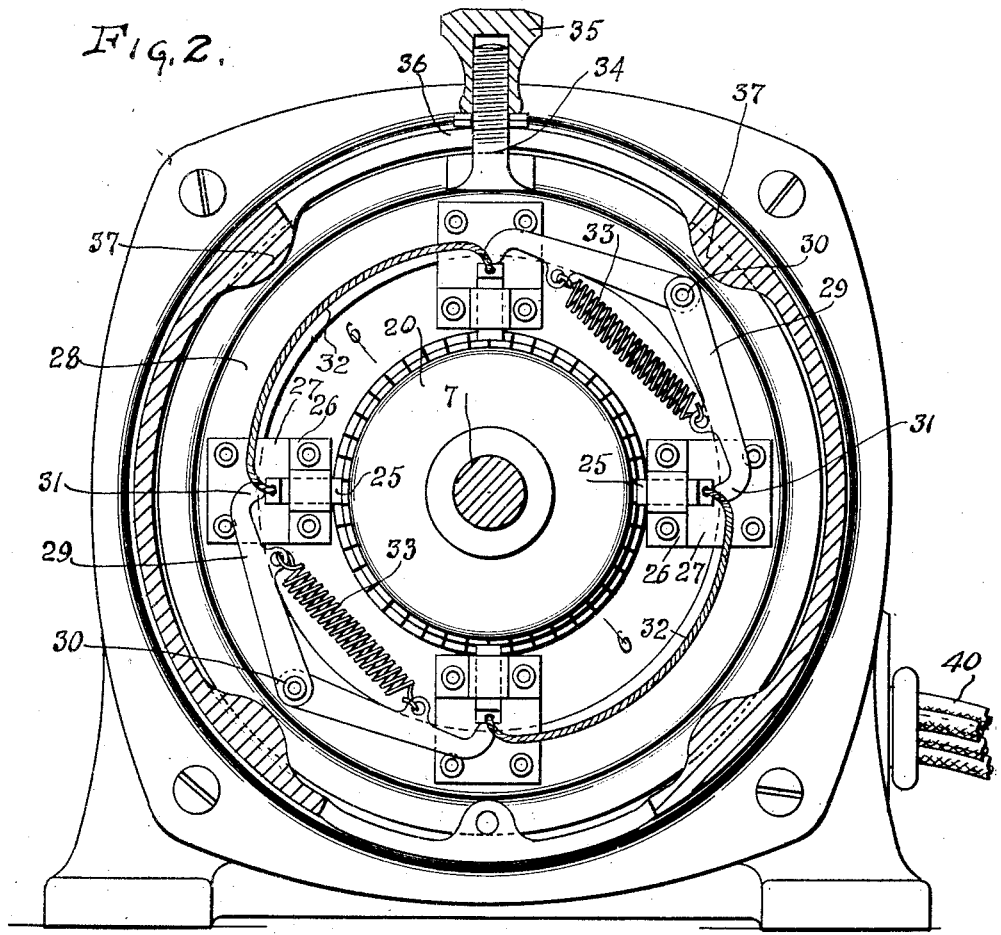

1,887,675

UNITED STATES PATENT OFFICE

STEFFEN A. BROWN AND EDGAR W. BROCKMEYER, OF DAYTON, OHIO, ASSIGNORS TO THE BROWN-BROCKMEYER COMPANY, OF DAYTON, OHIO, A CORPORATION OF OHIO

VARIABLE SPEED MOTOR

Application filed March 23, 1929. Serial No. 349,487.

Our invention relates to motors.

In particular, it is our object to provide a motor of variable speed.

It is our object to provide a variable speed motor of the induction repulsion type.

It is a further object to provide a motor which is reversible and the speed of which can be varied in either direction of movement.

It is our object to provide such a motor as a repulsion induction motor.

It is a further object of our invention to provide a single handle which will stop, start and determine the direction and the speed of the motor.

Referring to the drawings:

Figure 1 is a vertical section through the motor;

Figure 2 is a section on the line 4—4 of Figure 1 looking in the direction of the arrows;

Figure 3 is a section showing the means for holding the brush supporting ring.

Referring to the drawings in detail, we have illustrated a four-pole induction repulsion motor. 1 indicates the frame supporting the fields 2. The end cages 3 and 4 serve to support in the bearings 5 and 6 the armature shaft 7 carrying the armature 8. Mounted on the armature is the commutator 9. This commutator is provided with an internally cut away end portion 10 in which the ends 11 of the segments 12 engage. The commutator segments 9 are mounted on a steel shell 13 which it cut away at 14 to provide an area in which the pivot end 15 of the segments 12 may pivot. These segments 12 are provided with a horizontally-disposed member 16 which, with the contact member 11, forms a Y in the V of which rests the coil spring 17. The flat face 18 of the member 16 rests upon a sliding sleeve 19 that carries the segment cage 20. This sleeve 19 slides upon the collar 21 that is held in position on the armature shaft 7 by the ring 22 at one end and the spring 23 at the other. 23 engages a depending collar 24 of the sleeve 19 which thus serves to press the segment 12 against the steel housing 13 on its pivot 15 and resists the outward movement of the segments 12 in addition to the resistance of the spring 17 until such segments pass over dead center whereupon the spring 23 tends to keep the contact ends 11 of the segments 12 in contact position on the surfaces 10 of the armature segments 9.

We have shown a typical form of cut in and cut out segments and their control which we have found to be practical and satisfactory, but any one of various types of such constructions used in induction repulsion motors may be employed.

*Speed control and reversing mechanism*

The brushes 25 which engage the commutator segments 9 are slidably supported in guides 26. These guides are, in turn, mounted on plates 27 which plates are attached to a ring 28. Pivoted to this ring are the arms 29 connected to the ring at 30. The free ends of these arms at 31 engage the rear ends of the brushes which are connected together by the cable 32 and press the brushes inwardly against the commutator under the influence of the spring 33. This whole brush structure is carried upon the ring 28. The ring has attached thereto an arm 34 which projects outside of the cage 4 terminating in a hand button 35; a slot 36 in the cage 4 is provided for the movement of this handle 34. The ring 28 is held in position against the shoulder 37 of the cage 4 by the spring split ring 38 which, in turn, is held in position by the projecting lugs 39 on the cage 4. Thus, the ring is free to rotate carrying with it the brushes and brush rigging.

When the handle 34 is in its vertical position shown in Figure 2 the motor is in neutral position and at rest. As the handle is moved in the clockwise direction the motor turns clockwise. The speed increases as the handle is moved towards the extreme right.

If the handle is moved in the counterclockwise direction towards the left, the motor turns counter clockwise and the speed thereof increases as the handle is moved towards the left.

By a single movement of the handle we are enabled to start and stop the motor, control the direction of its rotation and the speed of its rotation. 40 designates the cables from the source of power that furnishes power to this alternating current, sixty-cycle, 110 or 220 volt motor.

Referring particularly to Figure 3, the four field coils are respectively designated 41, 42, 43 and 44. Between each of these coils are the gaps 45, 46, 47 and 48.

When the brushes are positioned opposite the gaps 45, 46, 47 and 48 the motor is at rest or in neutral position. When the brushes are turned in a clockwise direction so that they gradually approach the center of the coils 41, 42, 43 and 44 the speed will pick up and increase. The armature will then turn in a clockwise direction. Upon the return of these brushes to neutral position and their movement in a counter clockwise direction bringing the brushes gradually closer to the center of the coils 41, 42, 43 and 44 the speed will increase and the armature will turn in a counter clockwise direction just as the brushes are being moved in a counter clockwise direction.

For the purpose of simplicity, we have only shown the single windings 49 and 49a of the armature connected to commutator segments. It will be understood that the slots 50 of the armature will be occupied by other suitable windings.

Thus, as we bring the brushes under the poles we increase the speed by increasing the torque. The position of the brush determines the amount of voltage induced in the armature. The greater the induced voltage in the armature coils, the greater the torque. When the current is applied to the field windings an induced current is set up in the armature coils which are short circuited by the brushes 25, causing a rotating movement of the armature. Thereupon, other windings of the armature will be brought into proper relationship of the field windings and the operation will take place gradually increasing the speed, but this speed increase and the extent to which the maximum speed may be increased is controlled by the brush positions with respect to the field coils. Thus, we have a cooperative relationship between the segmental cut-in and cut-out mechanism, and the brush positioning mechanism as shown in Figure 4 and other figures. The cutout mechanism and cut-in mechanism determines the number of armature coils which are brought into place upon the accomplishment of a predetermined speed, while the brush setting mechanism determines what the maximum speed shall be which can be ultimately accomplished upon the cutting in of the contact segments 12. Consequently, we provide for the rotation of the armature first as a repulsion motor, and, upon the accomplishment of sufficient speed for a conversion to an induction type of motor, and then provide for the adjustment of the direction of movement of the armature and the maximum speed that it can attain before such conversion and thereby control the torque. We further provide for this complete control from a single handle.

It will be understood that the exact number of poles of the motor is not essential, but we have illustrated a typical form.

It will be understood that we desire to comprehend within our invention such modifications as may be necessary to adapt it to varying conditions and uses.

Having thus fully described our invention, what we claim as new and desire to secure by Letters Patent, is:

1. In a motor, in combination with an armature shaft and a commutator, a cage member supporting said shaft, said cage member having shoulders and a lug thereon, a brush supporting ring around said shaft between the shoulders and the lug, and a spring ring between the lug and the brush supporting ring to hold the brush supporting ring against the shoulders.

2. In a motor, in combination with an armature shaft and a commutator, a cage member having shoulders and a lug thereon, a spring ring between the shoulders and the lug, a brush supporting ring around said shaft between the shoulders and the spring ring whereby the brush ring is held against the shoulders, and means to rotate the ring about the shaft.

3. In a motor, in combination with an armature shaft and a commutator, a cage member having shoulders and a lug thereon, a spring ring between the shoulders and the lug, a brush supporting ring around said shaft between the shoulders and the spring ring whereby the brush ring is held against the shoulders, and means to rotate the ring about the shaft, said means including a handle extending through one side of the cage.

In testimony whereof, we affix our signatures.

STEFFEN A. BROWN.
EDGAR W. BROCKMEYER.